US006843267B1

(12) United States Patent
Van Schaftingen et al.

(10) Patent No.: US 6,843,267 B1
(45) Date of Patent: Jan. 18, 2005

(54) SYSTEM AND METHOD FOR CLOSING A TANK OPENING

(75) Inventors: Jules-Joseph Van Schaftingen, Wavre (BE); Stephane Leonard, Brussels (BE); Yannick Gerard, Kraainem (BE); François Dougnier, Boortmeerbeek (BE); Joël Op De Beeck, Duffel (BE); Paul Wouters, Vilvoorde (BE)

(73) Assignee: Solvay (Societe Anonyme), Brussels (BE)

( * ) Notice: Subject to any disclaimer, the term of this patent is extended or adjusted under 35 U.S.C. 154(b) by 10 days.

(21) Appl. No.: 10/088,675

(22) PCT Filed: Sep. 4, 2000

(86) PCT No.: PCT/EP00/08613

§ 371 (c)(1),
(2), (4) Date: Aug. 12, 2002

(87) PCT Pub. No.: WO01/21428

PCT Pub. Date: Mar. 29, 2001

(30) Foreign Application Priority Data

Sep. 22, 1999 (BE) .............................................. 9900632

(51) Int. Cl.[7] .............................................. F16K 24/04
(52) U.S. Cl. .......................... 137/202; 137/43; 137/587; 220/62.11
(58) Field of Search .......................... 137/43, 202, 587; 220/62.11

(56) References Cited

U.S. PATENT DOCUMENTS

| 5,139,043 A | 8/1992 | Hyde et al. |
| 5,425,470 A | 6/1995 | Duhaime et al. |

FOREIGN PATENT DOCUMENTS

EP        0 941 884 A2    9/1999

OTHER PUBLICATIONS

Abstract of Japanese Publication 05116548 Published May 14, 1993.

*Primary Examiner*—Gerald A. Michalsky
(74) *Attorney, Agent, or Firm*—Stites & Harbison PLLC; William E. Jackson

(57) ABSTRACT

System and for sealing an opening of a plastic tank with a multilayer wall by means of a multilayer plate itself constituted by a polymer structure including at least one internal barrier layer and an exterior layer compatible with the exterior layer of the tank wall. The multilayer plate is welded over an opening in the tank and the plate and the wall of the tank are superimposed so that the number of superimposed layers is equal to the sum of the number of layers in the plate and the number of layers in the wall of the tank.

15 Claims, 4 Drawing Sheets

SYSTEM AND METHOD FOR CLOSING A TANK OPENING

The present invention concerns a system for closing a tank opening.

Liquid or gas tanks used in industry or onboard vehicles of various types must generally meet standards for tightness and permeability related to the type of use for which they are designed and the environmental requirements with which they must comply. We are currently seeing, both in Europe and around the world, a considerable strengthening of requirements concerning the limitation of pollutant emissions into the atmosphere and into nature in general. The design of liquid and gas tanks is consequently evolving rapidly in the direction of techniques are more capable of guaranteeing both tightness and safety under various conditions of use. Furthermore, every effort must be made to reduce as much as possible any losses originating from the various conduits and accessories connected to the tanks. One means that is sometimes used is to incorporate certain accessories and conduits inside the tanks, thus eliminating their interface with the external atmosphere.

On the other hand, there are tanks in use having multilayer structures that include one or more layers of impermeable material. Incorporating accessories into such tanks poses the problem of providing a tight and impermeable seal for the opening cut into these tanks so that the accessories can be inserted into them. Moreover, the emissions issuing from the accessories are of far greater relative importance in the case of multilayer tanks, whose permeability per se is substantially lower than in conventional tanks.

It is known from the patent U.S. Pat. No. 5,139,043 to cover a rollover valve of a plastic fuel tank that partly passes through an opening cut into the wall of the tank with a device that serves as a cover layer for the portion of the valve that lies over the opening and makes it possible to tightly weld the valve to the wall of the tank.

In this patent, there is no mention of the particular problem of tanks with multilayer structures, and the cover of the valve is monolayer. Moreover, the valve is not completely located inside the tank.

The object of the present invention is to provide a system for sealing a tank that is adapted to tanks with multilayer structures and considerably limits liquid and gas losses compared to the conventional sealing systems.

To this end, the invention concerns a system for sealing an opening of a plastic tank with a multilayer structure, constituted by a plastic plate welded to the wall of the tank at the location of the periphery of the opening, wherein the plate itself is constituted by a multilayer structure whose external layer welded to the tank has a composition compatible with that of the layer constituting the external wall of the tank. The term external layer designates a layer, one side of which is adjacent to another layer of the structure and the other side of which is in contact with the environment outside this structure.

The term tank means an enclosed chamber, of various shapes, generally impermeable to the outside, which can be equipped with various accessories that are internal or that pass through the wall of the chamber. The tank can be a gas tank, a liquid tank, or a tank designed to contain both a gas and a liquid. Preferably, it is a liquid tank or a tank for liquids also containing a gas phase.

Certain tanks have one or more openings, i.e. a cutout which may or may not be circular in shape, cut through the wall of the tank for various reasons, for example to make it possible to insert into the tank one or more accessories that it is impossible to incorporate into it at the time of its manufacture.

In order to be able to use the tank for its normal usage of storing and containing liquid and gas, it is necessary to design and adapt a sealing system capable of closing the tank as hermetically as possible after the insertion of the accessory.

According to the invention, the sealing system is designed for plastic tanks with multilayer structures. The term plastic refers to any synthetic polymer, thermoplastic or thermosetting material that is in the solid state under the ambient conditions, and to the mixtures of at least two of these materials. The polymers in question include homopolymers as well as copolymers (particularly binary or ternary). Non-limiting examples of such copolymers are: randomly distributed copolymers ("statistic copolymers"), sequenced copolymers, block copolymers and graft copolymers. Thermoplastic copolymers, including thermoplastic elastomers, are preferred.

The plastic tanks according to the invention are in the form of tanks with a multilayer structure. Tanks comprising at least one layer of high-density polyethylene are especially preferred. Tanks that are particularly preferred are those whose structure also includes at least one internal layer made of barrier material, i.e. a material, generally polymeric in nature, that has a high degree of impermeability to certain liquids and gasses.

It is possible, for example, to use known barrier compositions such as those used to make fuel tanks impermeable. Non-limiting examples of such barrier compositions are: polyamide or copolyamide-based resins, statistic ethylene and vinyl alcohol copolymers, or even thermotropic liquid crystal polymers such as the copolyesters of p-hydroxybenzoic acid and either 6-hydroxy-2-naphthoic acid or terephthalic acid and 4,4'-biphenol (for example the copolyesters marketed under the trademarks VECTRA® and XYDAR®).

The term "plate" indicates any solid element of small thickness relative to its surface area and whose rigidity is similar to that of the walls of the tank. According to the invention, the material constituting the plate comprises a plastic material. Preferably, the plate that is part of the sealing system according to the invention is made exclusively of plastic material. The plate can have various shapes; most often, the shape of the plate depends on the various types of tanks and on the location of the opening to be sealed on the surface of these tanks. The plate often has a surface that is flat or curved slightly inward, particularly in the case of an opening with small dimensions such as, for example, circular openings whose diameter does not exceed 80 mm.

The plate according to the invention is welded to the wall of the tank at the location of the periphery of the opening. This means that the plate is made integral with this wall through the contact and partial interpenetration of the molecules of a portion of the surface of one of the two main sides of the plate juxtaposing the edges of the latter and forming a sealing surface in the form of a closed ring, a circular shape, or any shape and more or less precisely molded to the outer perimeter of this side of the plate, with the molecules of a similar surface of the tank, located on the edge of the opening, along its entire periphery.

According to the invention, the plate itself is constituted by a multilayer structure whose external layer welded to the tank has a composition compatible with that of the layer constituting the external wall of the tank.

Compatibility in this case means a chemical and physical compatibility of the constituents of the respective compositions of the layer of the plate welded to the tank and the external wall of the latter in the vicinity of the opening.

Good compatibility prevents any phenomena of segregation of certain constituents of the respective compositions of the welded parts, as well as any chemical reaction or physical phenomenon detrimental to the properties of the tank whose opening is thus sealed. Good compatibility generally guarantees the long-term adhesion of the plate to the tank.

One particular system that is preferred according to the invention is the one in which the tank and the plate comprise means for making them impermeable to liquids and gasses. The means for making the plate and the tank impermeable can be identical or different. It is generally preferred that these means be identical, and in particular that they comprise identical barrier compositions.

It is possible to incorporate these barrier compositions into one of the layers of the plate or to insert a particular additional layer, essentially constituted by a barrier composition, into the structure. Preferably, an additional layer essentially constituted by a barrier composition is inserted into the structure.

The multilayer structure of the plate can be different from that of the walls of the tank itself. It can also be identical to the latter. Sealing systems in which the structure of the plate is identical to that of the walls of the tank are often preferred. Most particularly preferred are systems in which, within identical structures, the barrier compositions themselves are identical and constitute identical polymer layers.

In a variant, the multilayer structure of the plate can also comprise two distinct barrier layers. A preferred example according to this variant is the one in which there are plates comprising two complete structures identical to that of the walls of the tank, stacked on top of each other, and resulting from the compression of two structures identical to the walls of the tank. Another variant consists of creating in the vicinity of the edge of the plate an indent in which the thicknesses of the layers are reduced, particularly those of the layers other than the barrier layer. The advantage here is to further limit the risk of loss by emission at the place where the plate is welded to the tank.

The system according to the invention is quite suitable for sealing a simple opening of a tank. It is also suitable for sealing an opening that lies over an accessory located inside the tank.

According to a particular embodiment of the sealing system according to the invention that is preferred, the plate is integral with at least one accessory located on the internal surface of the tank. The term accessory indicates any element in general through which liquid or gas passes, or which is in contact with liquid or gas and fulfills a particular function specific to the device of which the tank is a part, including a function for transporting liquid and/or gas between two other elements.

Non-limiting examples of such accessories include the following accessories:

- a receptacle containing any chemical or physical composition, particularly a vapor absorption canister;
- a liquid or gas gauge;
- an electrical connection leading to a liquid or gas gauge;
- a liquid or gas pump;
- a safety valve for the controlled closing of the tank in certain specific situations;
- a drainable receptacle for collecting liquid;
- an electrical connection for supplying power to the motor of a liquid or gas pump;
- a liquid conduit leading to a device for feeding any device, especially a motor;
- a liquid-vapor separation device.

Any combination of at least two accessories can be used, possibly in the presence of several instances of the same accessory.

According to this embodiment, the accessory is integral with the plate, i.e., it is joined to the plate by a mechanical means. The accessory is attached to the plate by any mechanical means that is compatible with the type of the tank, the nature of the liquid and the gas that is stored in it, and the normal use that is made of the tank. The plate can provide a means for grasping and transporting the accessory. It is possible, for example, to use a plate to which the accessory has been attached by a mechanical mounting device. Such devices include, for example, screws, nuts, clipping systems, etc. It is also possible to use a plate and an accessory that have been attached during their production, for example by molding. It is also possible to use a more permanent means of attachment such as adhesive bonding or welding. It is generally preferable for the accessories to be attached to the plate by welding.

The accessory attached to the plate is disposed relative to the latter on the side of the plate that is inside the tank when it is sealed.

Accessories of various types belong to this embodiment. Some examples that may be mentioned are Roll-Over Valves (ROV), On-Board Refueling Vapor Recovery valves (ORVR), On-Board Diagnostic devices (OBD), and liquid-vapor separators.

Some of these accessories can include at least one conduit that passes through the plate via a hole cut into the latter. In this case, it is often advantageous to equip the opening through which the conduit exits with a seal.

The plate can also be shaped so as to adapt as closely as possible to the environment of the opening to be sealed, as well as to the shape and the volume of the accessory to which it is attached. A plate attached to a liquid-vapor separator comprising a vapor escape conduit that passes through the plate via a hole has produced good results.

One particular sealing system consists of using a tank whose wall carries mounting pins in the vicinity of the opening. These make it possible to support the wall during the welding operation, in case of a flexible deformation of this wall.

The invention also concerns a method for sealing a plastic tank with a multilayer structure that makes it possible to strictly limit losses of liquid and gas into the environment. It also provides the option of integrating at least one accessory into the inside the tank.

To this end, the invention concerns a method for sealing an opening of a plastic tank with a multilayer structure by means of a plastic plate, according to which the plate is welded to the external layer of the tank in the location of the periphery of the opening, which is characterized in that the welded plate has a multilayer structure wherein the layer welded to the tank has a composition that is compatible with the composition of the external layer of the tank.

In this method, the terms tank, opening, seal, plastic, multilayer structure, plate, weld, location of the periphery of the opening, and compatible composition have exactly the same meanings as those explained above for the sealing system.

The plate used in this method can have various origins. It can, for example, be produced independently of the tank itself, at a different time or not, by means of a specific process that is not necessarily identical to that used to produce the tank. For example, the plate can be obtained by coextrusion followed by compression molding. It can also be obtained by molding using one of many known techniques. Such techniques are, for example, blow molding, compression molding, injection molding and thermoforming.

When the plate is produced independently of the tank, an opening in the tank is produced whose dimensions are slightly smaller than those of the tank, and the opening is subsequently sealed by the welding of the plate.

In a variant, the plate can be produced simultaneously with the tank and cut from the multilayer plastic material used to produce the tank. This way of working is especially advantageous from the point of view of synchronizing the production of tanks equipped with their accessories. It is possible, for example, to cut the plate directly from a region of the wall of the tank after the production of the latter, or from a part of the latter. This variant also assumes that the innermost external layer of the multilayer structure of the tank is compatible with its outermost layer.

Another variant is to cut the plate from the scraps of the tank production, as long as they have the appropriate multilayer structure.

It is also possible to cut the plate from an extension of the tank specially designed for this purpose and produced simultaneously with the latter.

Lastly, it is also possible to produce plates comprising two complete structures identical to that of the walls of the tank, by compressing two structures identical to the wall of the tank. In this case, it is possible, for example, to compress a particular part of the parison used to produce the tank. In doing this, it is especially advantageous to compress two identical structures of the plate against the mold for producing the tank.

The operation for welding the plate to the tank can be done using any generally known technique by itself. It is possible, for example, to use the mirror welding technique or the laser welding technique. The mirror welding technique is preferred.

According to a particular embodiment of the method according to the invention, at least one accessory is attached to the plate, on the side inside the tank. Any method of attachment that is compatible with the tank, the nature of the liquid and the gas it contains, and the conditions of its use is generally suitable.

It is preferable, however, to use a welding method to perform this attachment.

Here again, the terms attachment and side inside the tank have the same meanings as already explained above in the case of the sealing system.

In this particular embodiment of the method according to the invention, a first variant consists of welding at least one accessory to the plate before sealing the opening of the tank by welding the plate attached to the accessory to the periphery of this opening.

This way, the plate plays the role of supporting the accessory and allows it to be easily inserted inside the tank.

By contrast, a second variant consists of attaching, in a first step, at least one accessory to the inner wall of the tank adjacent to the opening, and in a second subsequent step, of sealing the tank by welding the plate simultaneously to the accessory and to the periphery of the opening.

Whichever embodiment of the method is used, a problem can arise during the operation for welding the plate to the wall of the tank when the latter, for any reason, experiences a flexible deformation in the vicinity of the opening, for example under the influence of its own weight or as a result of forces exerted perpendicular to the surface of the tank during the welding. Such a situation can actually occur when the tank has come directly from production and the temperature of its walls is still relatively high. Another reason could be that the diameter of the opening is relatively large and the plastic material in the vicinity of the edge of the opening is not supported as effectively as in the case of small openings.

The invention also concerns a sealing method that solves these problems of the flexible deformation of the wall of the tank, while supporting the wall of the tank in the vicinity of the opening during the plate welding operation by means of pins molded onto this wall.

The pins are molded to the external wall of the tank in the vicinity of the periphery of the opening. The wall of the tank is supported in this location by means of clamps that clamp onto the pins.

Pins similar to those described above can also be used while the plate is cut from the wall of the tank, in order to prevent the deformation of the latter.

The pins can also be used to correct, prior to the welding operation, any unevenness that may occur on the surface of the tank.

Lastly, they can also contribute to making the shape of the external surface of the tank correspond perfectly to that of the plate.

The invention also concerns the use of the method described above to seal an opening of a fuel tank, particularly for a motor vehicle.

The term motor vehicle designates vehicles driven by a thermal engine such as trucks, cars and motorcycles.

FIGS. 1 through 4 below are provided for the purpose of illustrating the invention, without limiting the scope thereof.

Figure 1:
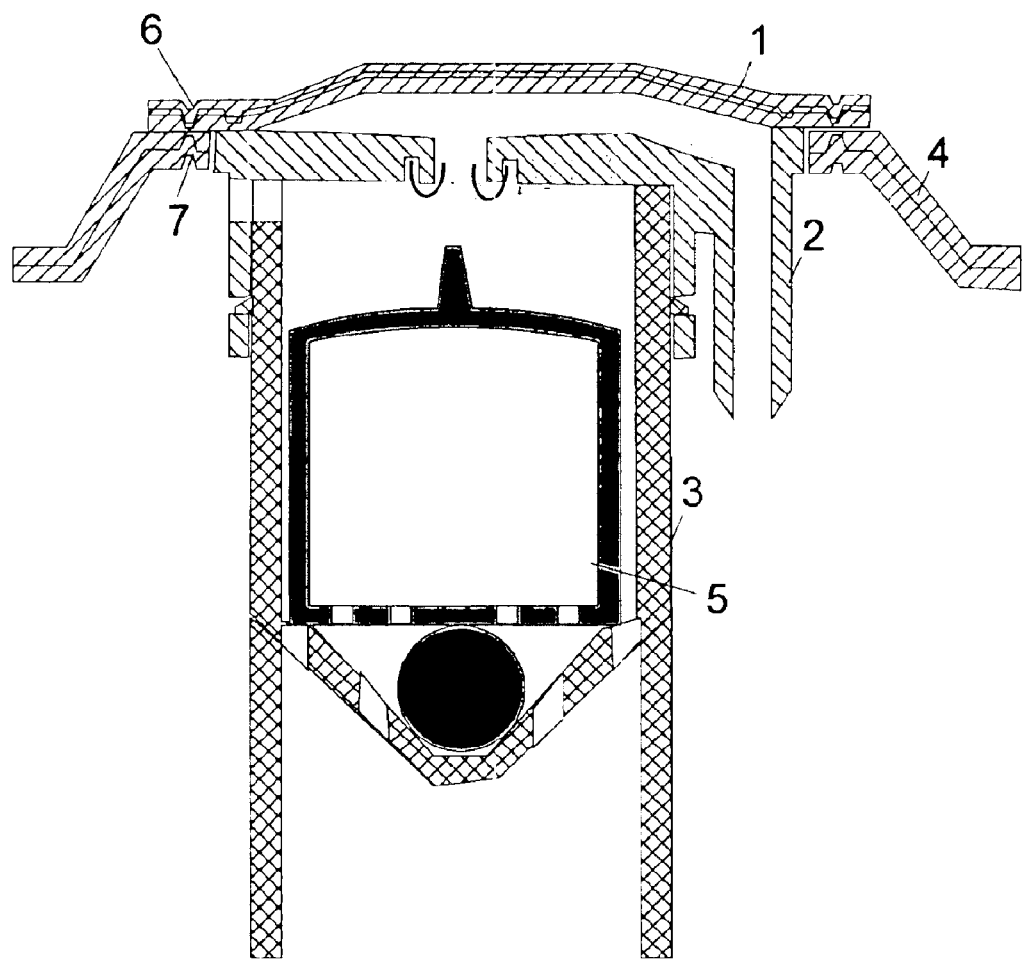
FIG. 1 is a cutaway view of a fuel tank with an opening sealed by a plate carrying accessories constituting a first embodiment of the invention.

FIG. 1 represents a sectional view of a fuel tank (4) with 6 layers (PEHD/regrind/maleic anhydride grafted PE/EVOH/maleic anhydride grafted PE/PEHD) having an opening sealed by a plate (1) carrying two accessories. The coextruded plate (1) is compression molded against the blow mold of the tank by clamping two walls of the tank and welded using the heated mirror technique to a pipette (2) made of PEHD. The pipette (2) also holds, by mechanical latching, an ROV valve (5) equipped with a polyacetal skirt (3). The end piece of the pipette (2) is connected via an internal ventilation line to the tank (4), not shown in the figure.

The plate (1) is then welded by means of a heated mirror to the external wall of the tank (4).

Advantageously, no ejection of liquid can occur from the tank (4) to the inside of the pipette (2) because of the tightness of the joint between the pipette (2) and the plate (1).

The coextruded plate (1) and the tank (4) both include indents (6) and (7) that ensure a connection of the internal barrier layers to the multilayer structures of the plate (1) and the tank (4) perpendicular to the weld paths. This advantageously results in a substantial reduction in emissions.

Figure 2:
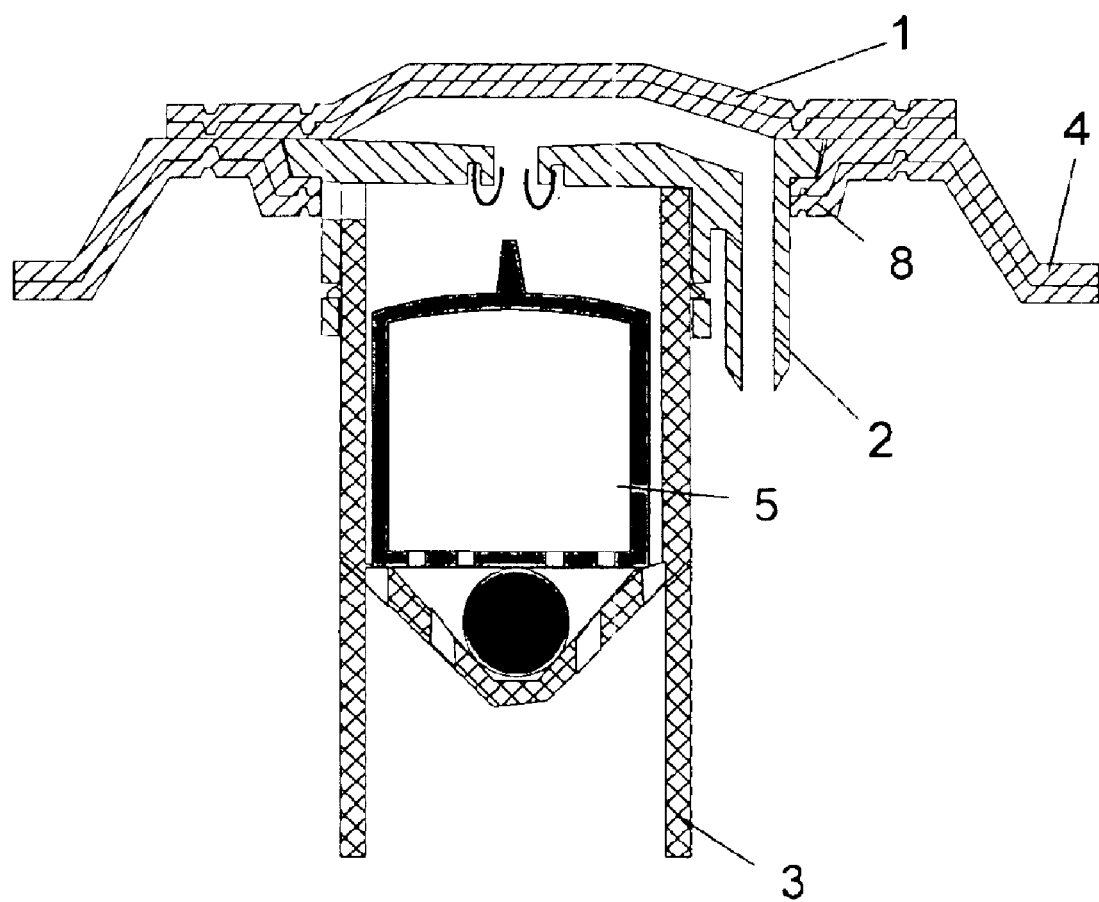
FIG. 2 is similar to FIG. 1 but accessories are supported by tank wall and constitutes a second embodiment of the invention.

FIG. 2 illustrates a system similar to that in FIG. 1 wherein a pipette (2), an ROV valve (5) and the wall of a tank (4) have simultaneously been welded to a coextruded, compression-molded plate (1). This plate (1) is obtained in advance by blow molding in a cavity adjoined to the one used to blow mold the tank. In this variant, the valve (5) is still attached to the pipette (2) by latching, but the pipette-valve assembly is disposed on a flange (8) cut into an indent in the wall of the tank (4) on the periphery of an opening.

Figure 3:
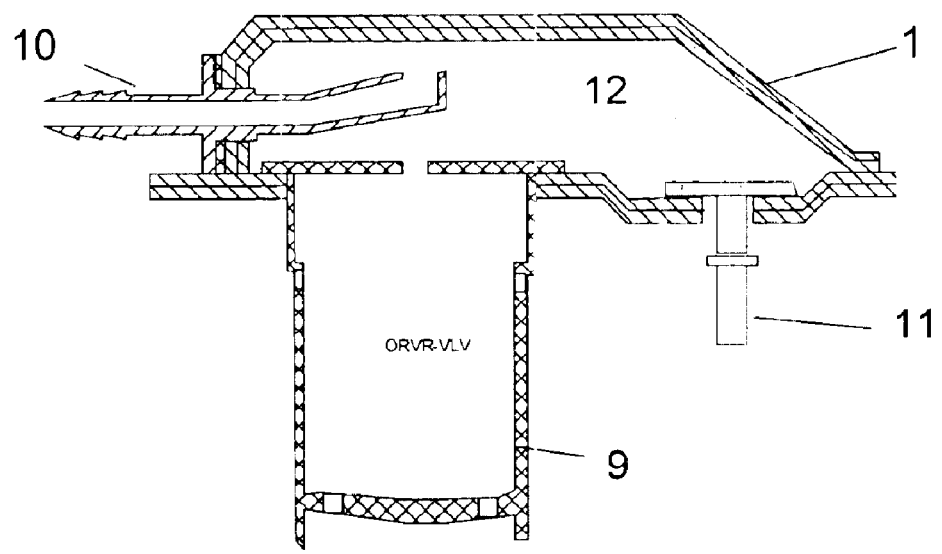
FIG. 3 is a third embodiment of the invention where a plate sealing an opening of a tank carries a liquid-vapor separator.

The mirror welding of the plate (1) to the pipette (2) and to the tank (4) is then performed in a single operation. P FIG. 3 illustrates a coextruded plate (1) sealing an opening of a tank and carrying a liquid-vapor separator. The plate (1) is molded, as in the case described in FIG. 2, by blow molding a parison into a cavity adjoined to the one used for blow molding the tank. The plate (1) is equipped with and passed through by an outgassing pipette (10) that has a raised internal opening attached to the plate and equipped with a joint at the place where the plate (1) passes through. This pipette is made of a material with low permeability.

A valve (9) of the ORVR type is welded to the wall of the tank along the periphery of the opening and communicates directly with the internal volume of the latter.

A pipette (11) is also welded to the tank and connected inside the latter to a valve (not illustrated in the figure) located in another area of the tank.

A space (12) delimited by the wall of the tank, the ORVR valve, the pipette, and the coextruded plate (1) constitutes a liquid-vapor separating device.

This device has the following advantages, compared to conventional devices:

Integration of the liquid-vapor separation function into the tank;

Ease of attachment and possibility of using various techniques for attaching the external pipette (10) because of the accessibility of the internal and external sides of the plate prior to welding;

Utilization of an ORVR valve (9) and a pipette (11) made of HD polyethylene, easily welded to the external wall of the tank without harming its impermeability;

Simplification of the production of the valve (9) and the pipette (11);

Covering of the areas of the walls of the tank that are not very thick after production by blow molding, such as the areas near the valve (9) and the pipette (11).

Figure 4:
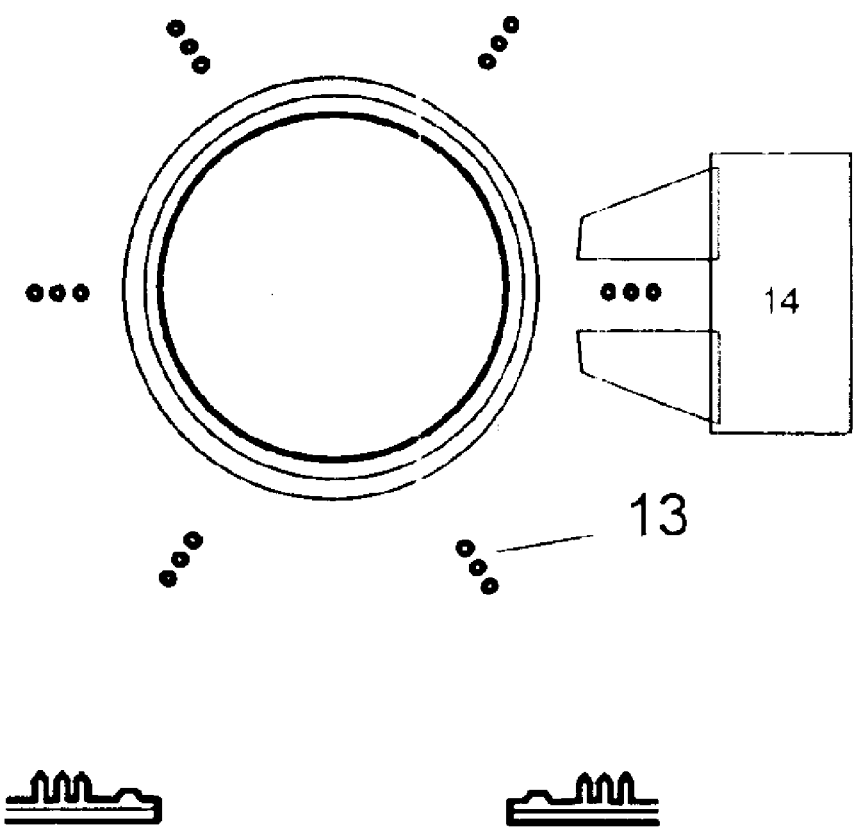
FIG. 4 shows a system for supporting the wall of a tank during operations on the tank.

FIG. 4 illustrates a system for supporting the areas of flexible deformation of the tank in the vicinity of the opening in the wall of the tank, in diametrical positions near the opening. Pins (13) made of PEHD, in groups of 3 and disposed in rows, are molded during the blow molding of the tank on the periphery of the area where the opening is cut out.

Clamps (14) are then placed, in the open position, over the wall of the tank so as to surround each group of 3 pins (13). After being locked into position in the direction perpendicular to the wall of the tank, they are then closed and clamped onto the pins so as to support the wall of the tank during the entire duration of the operations for cutting the opening, possibly machining its edges, possibly inserting accessories, and welding the plate so as to seal the tank.

What is claimed is:

1. A system for sealing an opening of a plastic tank with a multilayer structure comprising at least one layer of high-density polyethylene and at least one internal barrier layer, constituted by a plastic plate welded to the wall of the tank in the location of the periphery of the opening, the plate itself is constituted by a multilayer structure also comprising at least one layer of high-density polyethylene and at least one internal barrier layer and whose external layer welded to the tank has a composition compatible with that of the layer constituting the external wall of the tank, wherein in the location where the external layer of said plate is welded to the layer constituting the external wall of the tank, said plate and said wall of the tank are superposed so that the number of superposed layers in this location equals the sum of the number of layers in said plate and the number of layers in the wall of the tank, and so that the barrier layer of said plate is not in continuity with the barrier layer of said tank.

2. System according to claim 1, wherein said plate does not pass through said wall of the tank.

3. System according to claim 1, wherein the tank and the plate comprise identical means for making them impermeable to liquids and gasses and are constituted by the same multilayer structure.

4. System according to claim 1, wherein said plate is equipped with a conduit that passes through said plate.

5. System according to claim 4, wherein said conduit is equipped with a seal in the location where said conduit passes through said plate.

6. System according to claim 1, wherein the plate is attached to at least one accessory located on the side inside the tank.

7. System according to claim 6, wherein the accessory is a liquid-vapor separator comprising a vapor escape conduit that passes through the plate via a hole.

8. System according to claim 1, wherein the plate is constituted by a multilayer structure comprising two complete structures identical to that of the walls of the tank, stacked on top of each other and resulting from the compression of two structures identical to the walls of the tank.

9. System according to claim 1, wherein the wall of the tank carries mounting pins in the vicinity of the opening.

10. A method for sealing an opening of a plastic tank with a multilayer structure comprising at least one layer of high-density polyethylene and at least one internal barrier layer, by means of a plastic plate also comprising at least one layer of high-density polyethylene and at least one internal barrier layer, according to which the plate is welded to the external layer of the tank in the location of the periphery of the opening, the welded plate having a multilayer structure whose external layer welded to the tank has a composition that is compatible with the composition of the external layer of the tank, wherein said plate is welded so that in the location where an external layer of said plate is welded to the layer constituting the external wall of the tank, said plate and said wall of the tank are superposed so that the number of superposed layers equals the number of layers in said plate and the number of layers in the wall of the tank, and so that the barrier layer of said plate is not in continuity with the barrier layer of said tank.

11. Method according to claim 10, wherein at least one accessory is attached by welding to the plate, on the side inside the tank.

12. Method according to claim 11, wherein at least one accessory is welded to the plate prior to sealing the opening of the tank by welding the plate carrying the accessory to the periphery of this opening.

13. Method according to claim 11, wherein at least one accessory is attached to the internal wall of the tank adjacent to the opening prior to sealing the tank by simultaneously welding the plate to the accessory and to the periphery of the opening.

14. Method according to claim 10, wherein the wall of the tank is supported in the vicinity of the opening during the operation for welding the plate by means of pins molded onto this wall.

15. Method according to claim 10, wherein the tank is a fuel tank for a motor vehicle.

* * * * *